3,359,217
RIGID URETHANE FOAM COMPOSITIONS PREPARED UTILIZING AN ACID CATALYZED SORBITOL - PROPYLENE OXIDE CONDENSATION PRODUCT
John D. Brandner, Wilmington, Del., assignor to Atlas Chemical Industries, Inc., Wilmington, Del., a corporation of Delaware
No Drawing. Filed July 21, 1961, Ser. No. 125,683
3 Claims. (Cl. 260—2.5)

This invention relates to improved urethane foam compositions and their preparation, and in particular, to improved polyether-based urethane foam compositions which foam rapidly to form rigid urethane foams and which have a relatively fast rate of cure.

The use of urethane foams for insulation purposes and to protect surfaces from corrosion and shock has been developing rapidly in recent years. Rigid urethane forms have high strength, good thermal stability, and excellent thermal and acoustical insulation properties, and as a result of these useful properties, rigid urethane foams are rapidly growing in importance as insulating materials which may be applied in a variety of ways. One recently developed technique for applying urethane foam compositions is to spray a two component urethane foam composition on surfaces to be insulated, and the improved urethane foam compositions of this invention are particularly useful in spraying applications.

One of the problems associated with applying urethane foam compositions is that dripping and sagging occur if the foam composition does not cure rapidly. This problem is particularly prevalent in spray foaming applications in which the pressure of the spray gun may cause the foam to drip and fall if the foam composition does not cure rapidly.

It is an object of this invention to provide an improved urethane foam composition which will rapidly cure to a rigid urethane foam.

Another object of this invention is to provide an improved urethane foam composition which will foam rapidly and which will become tack-free at a fast rate.

It is a further object of this invention to provide an improved urethane foam having improved heat distortion properties, improved retention of low and constant thermal conductivity (K factor), and improved high and low temperature stability.

Other objects and purposes of this invention will be evident to those skilled in the art in view of the following description of the invention.

It has been discovered that an improved urethane foam composition can be prepared by using an acid catalyzed polyoxyalkylene polyether as the polyhydric compound component in a urethane foam reaction mixture. Urethane foam reaction mixtures prepared in accordance with this invention may comprise a urethane prepolymer containing free isocyanato groups, a catalyst for curing urethane foams, a surface-active agent, a blowing agent and an acid catalyzed polyoxyalkylene polyether which reacts with the free isocyanato groups of the prepolymer; or a "one-shot" formulation comprising a polyisocyanate, a catalyst for curing urethane foams, a surface-active agent, a blowing agent and an acid catalyzed polyoxyalkylene polyether may be prepared. It has been found that if urethane foam reaction mixtures contain an acid catalyzed polyoxyalkylene polyether, they foam very rapidly and become track-free at a fast rate. In addition, the resulting urethane foam has improved heat distortion properties, (i.e. retains its shape at higher temperatures), low and constant thermal conductivity (K factor), and improved high and low temperature stability.

It is generally considered that a urethane foam curing catalyst, a surface-active agent and a blowing agent should be present in the reaction mixture in order to produce good urethane foams, though if desired, one or more of these ingredients may be omitted. The catalysts helps to initiate the reaction between the material containing free isocyanato groups and the polyhydric compound. Without the blowing agent, which causes the foam to rise, an extremely high density solid would be formed instead of the desired low density foam. The surfactant functions by trapping the blowing agent, and thereby promotes small cell size and better foams.

The polyoxyalkylene polyethers which are used in the compositions of this invention are prepared by reacting polyols containing from 3 to 9 hydroxyl groups per molecule with an alkylene oxide containing at least 3 carbon atoms per molecule in the presence of an acid catalyst. It has been found that by using an acid catalyst to carry out 1,2 and 1,3 alkylene oxide etherification reactions there is a tendency to form primary hydroxyl groups which is not present when an alkaline catalyst is used. In addition, regardless of the type of alkylene oxide which is used to carry out the etherification reaction, the polymers prepared using an acid catalyst seem to be less viscous than polyethers having the same alkylene oxide content prepared using an alkaline catalyst.

In general, polyols containing from 3 to 9 hydroxyl groups per molecule may be used to prepare the acid catalyzed polyethers used in this invention. The polyols function by providing hydroxyl groups which are reactive sites at which the alkylene oxide can attack. Polyols containing only 2 hydroxyl groups are not preferred because polyethers prepared from them do not usually produce rigid urethane foams. Polyols having more than 9 hydroxyl groups per molecule are not preferred because they are solid compounds which are difficult to process and handle and do not readily react with alkylene oxides. Typical of the polyols which are preferably used to prepare the acid catalyzed polyethers are glycerin, methyl glycerin, erythritol, pentaerythritol, arabitol, xylitol, monosaccharides such as arabinos, glucose, mannose, fructose, and disaccharides such as sucrose, lactose, maltose, etc. Mixtures of polyols may also be employed, such as the hexitol mixture obtained by catalytically hydrogenating invert sugar to a mixture of sorbitol and mannitol.

The polyol which is used to prepare the acid catalyzed polyoxalkylene polyethers may be either dry or may contain small amounts of water. The amount of water present in the polyol may range up to about 15 percent by weight, though it is preferred that about 5 percent by weight or less be present. Generally, better rigid urethane foams are produced if the polyol which is used to prepare the polyoxyalkylene polyether contains about 5 percent by weight or less of water.

The alklyene oxides which may be reacted with polyols to form acid catalyzed polyethers useful in this invention are those alkylene oxides which have three or more carbon atoms. Particularly preferred alkylene oxides are those which contain 1,2 or 1,3 oxide groups, for these tend to form primary hydroxyls in the presence of an acid catalyst. Representative compounds include propylene oxide, 1,2-butylene oxide, 1,3-butylene oxide, isobutylene oxide, trimethylene oxide, butadiene oxide, etc., as well as substituted alkylene oxides which contain various substituent groups such as the epihalohydrins. All of the above mentioned compounds are included within the term "alkylene oxide" as used in this specification and the claims which follow. Ethylene oxide is not preferred because polyethers prepared from it are hydrophilic (have a strong affinity for water) which adversely affects urethane foams. Currently, propylene oxide is the preferred alkylene oxide for preparing polyethers to be used to prepare urethane foams.

This invention is primarily concerned with the preparation of rigid urethane foams. Therefore, it is preferred to react from about 0.5 to about 3 moles of alkylene oxide per hydroxyl group on the polyol which is present in the reaction mixture. If more than about 3 moles of alkylene oxide per polyol hydroxyl group are reacted, the resulting polyether tends to form a flexible urethane foam rather than a rigid foam. Whereas, if less than about 0.5 mole of alkylene oxide per polyol hydroxyl group are reacted, the resulting polyether may be so viscous that it will be very difficult to react with the material containing free isocyanate groups.

In preparing the polyoxyalkylene polyethers, it is preferred that a catalyst be used which forms low viscosity, fast reacting polyethers. It has been discovered that if polyol-alkylene oxide reactions are carried out in the presence of an acid catalyst, low viscosity, fast reacting polyethers are produced. Though not to be limited by the following theories, it is considered that when an acid catalyst is used, 1,2 and 1,3 alkylene oxides tend to react with the polyol so as to form primary hydroxyl groups terminating the alkylene oxide chains. In general, acid catalysts tend to produce polyoxyalkylene polyethers having approximately half of their alkylene oxide chains terminated by primary hydroxyl groups, if 1,2 or 1,3 alkylene oxides are used to prepare the polyether whereas when a conventional alkaline catalyst is used, there is little or no tendency to form primary hydroxyl groups. In addition, it is considered that the acid catalyst promotes random reaction of alkylene oxides with the polyol hydroxyl groups which accounts for the formation of less viscous polyethers.

Any of the acid catalysts which are commonly used to carry out alkylene oxide condensations may be used to prepare the polyoxyalkylene polyethers. Typical acid catalysts which may be used are mineral acids such as perchloric acid, sulfuric acid, etc., and Lewis acid catalysts such as the trichloride, tribromide and trifluoride of boron, the chlorides and bromides of aluminum, titanium, and tin, and the chlorides of antimony, beryllium, bismuth, cadmium, gallium, iron, uranium, zinc and zirconium. In addition, complexes of Lewis acid catalysts with such organic compounds as ethers and alcohols may also be used. It has been found that boron trifluoride and its complexes are particularly effective catalysts for this reaction.

Procedures generally used to carry out reactions between polyols and alkylene oxides may be used. The acid catalyst is generally present in amounts of from about 0.1 to about 1.0 weight percent based on the weight of the hexitol-alkylene oxide reaction mixture, though the amount of catalyst used is not critical and is a matter of operator's choice.

If a urethane prepolymer is used as the source of free isocyanate groups, any of the conventional urethane prepolymers which contain free isocyanato groups may be used. Examples of types of conventional prepolymers which may be used are polyether-based urethane prepolymers, polyester-based urethane prepolymers and polyester-amide based urethane prepolymers. In particular, this invention relates to using polyether-based prepolymers, though the use of other types of urethane prepolymer are within the scope of the invention. In the discussion which follows, only the preparation of polyether-based urethane prepolymers will be presented, for the preparation of urethane prepolymers is well known, and it will be obvious to those skilled in the art that polyesters or polyester-amides can easily be substituted for polyethers in the prepolymer preparation.

In preparing the prepolymer, regardless of the type, it is essential that an excess of polyisocyanate be used in order that the prepolymer contains free isocyanato groups which can react with the polyoxyalkylene polyether hydroxyl groups. The amount of excess polyisocyanate used to prepare the urethane prepolymer is a matter of operator's choice, but in the final urethane foam reaction mixture, the hydroxyl groups present in the reaction mixture should be approximately stoichiometrically equal to the free isocyanato groups present in the prepolymer. Slight departures from exact stoichiometric proportions may be tolerated and often are advantageous for the purpose of modifying the physical properties of the foams.

The polyether-based urethane prepolymers may be prepared by any of the conventional procedures used to prepare urethane prepolymers, and any of the conventional polyisocyanates and polyethers can be used. Representative examples of polyisocyanates which may be used are 2,4-tolylene diisocyanate, metaphenylene diisocyanate, 4-chlor-1,3-phenylene diisocyanate, methylene-bis-(4-phenyl isocyanate) and 1,5-naphthylene diisocyanates. Generally the arylene diisocyanates are preferred though other types of polyisocyanates may be used.

Polyethers which may be used to prepare urethane prepolymers useful in this invention are preferably of the type formed by reacting a polyhydric alcohol of from 3 to 9 hydroxyl groups with an alkylene oxide. Representative of the polyhydric alcohols which may be used are glycerol, pentaerythritol, sorbitol, mannitol, saccharides, etc. Examples of useful alkylene oxides are propylene oxide and butylene oxide. In addition to using conventional alkaline catalyzed polyethers in preparing the urethane prepolymer, it should be noted that acid catalyzed polyoxyalkylene polyether compounds may also be used to prepare the urethane prepolymer as well as functioning as a reactant in the final urethane foam reaction mixture. Further descriptions of materials useful in preparing polyether-based urethane foams may be found in United States Patents 2,927,905, 2,953,533 and an article by J. E. Wilson, H. M. Truax and M. A. Dunn appearing in Journal of Applied Polymer Science, Vol. III, Issue No. 9, Pages 343-356 (1960).

The acid catalyzed polyoxyalkylene polyethers may also be used in "one-shot" urethane formulations. In this type of formulation, a polyisocyanate is used as the source of free isocyanate groups and the foaming operation is performed in one step in contrast to the two steps required when a urethane prepolymer is used. Any of the conventional polyisocyanates may be used, such as aliphatic, cycloaliphatic or aromatic diisocyanates. Typical of the polyisocyanates which may be used are 2,4-tolylene diisocyanate, 2,6-tolylene diisocyanate, o-, m-, p-xylylene diisocyanates, 4,4'-biphenylene diisocyanate, 1,5-naphthalene diisocyanate, tetramethylene diisocyanate and p,p'-bibenzyl diisocyanate. Generally the arylene diisocyanates are preferred though other types of polyisocyanates may be used.

As previously indicated, it is customary for the urethane foam reaction mixture to contain a surface-active agent, a curing catalyst and a blowing agent. The surface-active agent may be added to the reaction mixture prior to or simultaneously with the addition of the blowing agent. The surfactant serves to aid in the mixing of the reactants and yields foams of more uniform texture and cell size. Illustrative of such surfactants are the polymeric organo silicones of medium viscosity, such as the polydimethyl siloxane of about 50 centistokes viscosity. Examples of commercially available organo silicones are DC200 fluid sold by Dow Corning Company and Silicone L520 sold by Union Carbide Corporation. The surfactant is generally used in amounts ranging from about 0.1 to about 1.0 weight percent based on the total weight of the reaction mixture.

A curing catalyst or accelerator may also be present during the foaming step of the reaction. Catalysts effective in promoting the reaction of isocyanate groups with active hydrogen atoms are well kown. Two types of catalyst often used are tertiary amines and organo-tin derivatives. Typical of these catalysts are triethyl amine, N-methyl morpholine, triethylene diamine, hexahydrodimethyl aniline, dibutyltin dilaurate and dibutyltin di-2-ethyl hexanoate. The curing catalyst is generally present in amounts ranging from about 0.10 to about 2.0 weight percent based on the total weight of the reaction mixture, though from about 0.15 to about 1.0 weight percent is preferred. One of the advantages achieved by using acid catalyzed polyoxyalkylene polyethers is that less curing catalyst may be used in the urethane foam reaction mixture.

Any suitable method for generating gas to induce foaming during the reaction between the isocyanate-containing material and the polyoxyalkylene polyether may be employed within the scope of this invention. Water may be used as the blowing agent, for the addition of a small amount of water to the reaction mixture results in the evolution of carbon dioxide by reaction of the water with free isocyanato gorups.

Excellent rigid foams may be prepared by dispersing a low-boiling liquid blowing agent in the reaction mixture, which blowing agent vaporizes under the influence of the heat of reaction to form a gas which is trapped in the urethane composition. Particularly suitable as blowing agents are the halogenated lower alkanes, such as $CH_3Cl$, $CHCl_2F$, $CHClF_2$, $CCl_2F_2$, $C_2Cl_2F_4$ and similar compounds. When a prepolymer is used, the blowing agents of the halogenated alkane type may be incorporated in the urethane prepolymer or may be added to the acid catalyzed polyoxyalkylene polyether phase. In either instance, once the reaction between the polyether hydroxyl groups and the free isocyanato groups begins, the heat liberated by the reaction will cause the evolution of gas which results in the formation of a foam. It is customary to use about 30 weight percent, based on the total urethane reaction composition, of the halogenated alkane type of blowing agent, but this can be varied according to the foam properties desired.

As previously stated, the use of acid catalyzed polyoxyalkylene polyethers as the polyhydric compound in a urethane foam reaction mixture results in rapid foaming and rapid curing of the urethane foam composition. By using the acid catalyzed polyoxyalkylene polyethers in accordance with this invention the foamed urethane network is formed quicker, thereby preventing sagging and dripping of the foam.

The improved urethane foam compositions of this invention have particular utility in urethane spray foaming applications which require the foam compositions to foam and cure rapidly. It is obvious that these improved urethane foam compositions are readily adapted for use in a two component spray gun. The urethane prepolymer may be used to comprise one component and the acid catalyzed polyoxyalkylene polyether the other component, with the blowing agent, and surfactant dispersed in either component or in both. It is generally preferred that the curing catalyst not be added to the prepolymer component for this might cause premature foaming or gelation.

The following examples illustrate the preparation of acid catalyzed polyoxyalkylene polyethers and their use in preparing urethane foam compositions. In some of the examples, urethane foam formulations were tested for cream time, foam time, tack-free time and hardness time which are defined as follows:

*Cream time.*—The components of two component urethan foam formulations are delivered from a mixing head in liquid form, and as the urethane reaction is initiated, the mixture turns a creamy white and starts to rise. The time required for the reaction to be initiated and the reactants to turn white and start to rise is referred to as the cream time.

*Foam time.*—The time which elapses between when the two components are delivered from the mixing head until the foam rises completely in the mold is called the foam time.

*Tack-free time.*—The time which elapses from when the components are delivered from the mixing head to when one can touch the skin of the foam without any adherence of the foam to the hand is called the tack-free time.

*Hardness time.*—The time which elapses from when the components are delivered from the mixing head to when the skin of the foam cannot be moved and becomes brittle is called the hardness time.

*Example I*

A polyoxyalkylene polyether was prepared by reacting sorbital and propylene oxide in the presence of a boron trifluoride etherate catalyst. 223.8 g. of sorbitol (dry basis), 14.5 g. of water and 3.5 g. of boron-trifluoride etherate were charged to an autoclave, and the temperature of the reactants was raised to about 90° C. 724 g. of propylene oxide were added to the autoclave over a period of about 3 hours. The reaction was continued for about 2 hours and the total reaction pressure ranged up to about 66 p.s.i. This reaction proceeded rapidly and substantially all of the propylene oxide was reacted. The reaction product was vacuum stripped under nitrogen at about 110° C. and 1.0 to 2.5 mm. for 3½ hours and then filtered through a funnel under nitrogen at about 130° C. Analysis of the product indicated that it had a Hydroxyl No. of about 475 and a sulfated ash content of 0.01. This product was very reactive when brought into contact with isocyanate containing material and yielded good rigid polyurethane foams.

*Example II*

A polyoxyalkylene polyether was prepared by reacting sorbitol with propylene oxide in the presence of 264 grams of boron-trifluoride etherate, with the reaction mixture containing much less water than in Example I. 253 lbs. of propylene oxide was reacted with 78 lbs. of sorbital, (99% pure), which amounts to a ratio of 10 moles of propylene oxide per mole of sorbitol. The reaction was carried out at a pressure of about 50 pounds per square inch, and the reaction temperature was maintained in the range of about 90–95° C. for about 2 to 2.5 hours. The residue ash was removed by passing the reaction mixture through a bed of anion exchange resin, and thereafter recovering a 99 weight percent yield of polyoxypropylene sorbitol polyether product.

*Example III*

To show the relative reactivities of polyoxypropylene sorbitol polyethers prepared with different types of catalyst in the preparation of rigid polyurethane foams the boron-trifluoride catalyzed sorbitol polyether of Example II was compared to a conventional polyoxypropylene sorbitol polyether also containing 10 moles of propylene oxide per mole of sorbitol, prepared with a conventional alkaline catalyst (NaOH). The acid catalyzed and alkaline catalyzed polyethers had approximately equal hydroxyl numbers. The following formulation was used:

Component A: Parts by weight
    Sorbitol polyethertoluene diisocyanate prepolymer (4.5/1 ratio of NCO/OH) _____ 92.6
    Trichlorofluoromethane _____ 34.0
Component B:
    Sorbitol polyether _____ 70.4
    Silicone surfactant _____ 1.0
    Tetramethylbutanediamine _____ 2.0

126.6 g. of Component A and 73.4 g. of Component B were mixed together, and the relative reactivities of the polyethers were compared as follows:

|  | Alkaline catalyzed Sorbitol polyether | Acid catalyzed Sorbitol polyether |
| --- | --- | --- |
| Cream time (sec.) | 30 | 0 |
| Foam time (sec.) | 160 | 50 |
| Tack-free time (sec.) | 210 | 115 |
| Hardness time (sec.) | 340 | 340 |

These results demonstrate that the acid catalyzed polyoxypropylene sorbitol polyether caused the urethane composition to foam more rapidly and to become tack-free at a much faster rate than the composition containing the conventional alkaline catalyzed polyoxypropylene sorbitol polyether. This indicates that the urethane composition containing the acid catalyzed polyoxypropylene sorbitol polyether cured at a faster rate which helps to overcome the problem of foam dripping and sagging.

*Example IV*

A polyoxypropylene sorbitol polyether containing only 5.7 moles of propylene oxide per mole of sorbitol was prepared using a boron-trifluoride etherate catalyst. 152.7 lbs. of a 70% aqueous sorbitol solution was vacuum dried to 99% sorbitol which was reacted with 192.5 lbs. of propylene oxide in the presence of 468 g. of boron trifluoride etherate catalyst. The reaction temperature was held between 90–95° C. and there was a maximum reaction pressure of 50 p.s.i.g. The time required to add the propylene oxide was from 2–2.5 hours, and the reaction was continued for an additional half hour. The reaction product was purified by a cation-anion exchange resin method and by vacuum stripping to a final ash content of 25 p.p.m.

It was found that the polyoxypropylene sorbitol polyether prepared in this manner had a much lower viscosity than a similar polyether prepared with an alkaline catalyst. This results in a urethane foam reaction mixture which is much easier to handle when added to the foam machine. The sorbitol polyether containing 5.7 moles of propylene oxide per mole of sorbitol was evaluated in the following urethane foam reaction mixture formulation:

Component A:                                    Parts by weight

Sorbitol polyethertoluene diisocyanate prepolymer _____ 50.90
Trichlorofluoromethane _____ 9.00

Component B:

Boron-trifluoride catalyzed polyoxypropylene (5.7) sorbitol _____ 31.45
Trichlorofluoromethane _____ 8.00
Silicone surfactant _____ 0.50
Tetramethylbutanediamine _____ 0.15

Component B was mixed with Component A and the following evaluations were made:

Cream time (sec.) _____ 17
Foam time (sec.) _____ 125
Tack-free time (sec.) _____ 125
Hardness time (sec.) _____ 160

The resultant urethane foam of Example IV was also tested and found to have an increased cross-linking density as shown by improved heat distortion, improved low and constant thermal conductivity, and improved low and high temperature stability.

*Example V*

This example was carried out to corroborate the improvement in the properties of the urethane foam produced by using an acid catalyzed polyoxypropylene sorbitol in the reaction mixture which was found in Example IV. A urethane foam prepared using a boron-trifluoride catalyzed polyoxypropylene sorbitol having an OH No. of 497 was compared to a urethane foam prepared from a conventional alkaline catalyzed polyoxypropylene sorbitol polyether having an OH No. of 500. The OH No. of the polyethers was approximately equal which indicates that there was approximately the same number of hydroxyl groups available to react with the free isocyanate groups.

The following physical properties were evaluated:

| | Alkaline Catalyzed Polyoxypropylene Sorbitol Urethane Foam | Acid Catalyzed Polyoxypropylene Sorbitol Urethane Foam |
|---|---|---|
| Core Density (lbs./ft.$^3$) | 1.94±0.03 | 2.00±0.02 |
| Compression before heat aging (p.s.i.) | 22.00±3.06 | 21.75±4.72 |
| Compression after heat aging (p.s.i.) | 12.75±2.42 | 16.00±3.70 |
| Water absorption after 48 hours (wt. percent) | 3.42±0.22 | 3.24±0.14 |
| Volume change after heat aging (percent) | 34.80±0.90 | 31.60±2.61 |
| Moisture vapor transmission | 2.03±0.14 | 1.61±0.12 |
| Heat distortion temperature (° F.) | 265 | 283 |

The results show that the urethane foam prepared in accordance with this invention was a better foam with respect to all properties which were measured.

*Example VI*

A "one-shot" urethane foam formulation was prepared using acid catalyzed sorbitol polyethers. In this formulation, polyoxypropylene (10) sorbitol and polyoxypropylene (6.3) sorbitol, which were prepared in the presence of a borontrifluoride etherate catalyst in a manner similar to that used in Example IV were reacted with tolylene diisocyanate. The following hand mixed formulation was prepared:

Component:                                      Parts by weight
Tolylene diisocyanate _____ 76.8
Polyoxypropylene (10) sorbitol _____ 46.6
Polyoxypropylene (6.3) sorbitol _____ 46.6
Silicone-glycol copolymer (DC-199 surfactant) _____ 1.0
Tetramethylbutanediamine _____ 0.8
Trichlorofluoromethane (Freon-11) _____ 28.0

This formulation reacted very rapidly to form a polyurethane foam having good physical properties.

*Example VII*

Sulfuric acid was used as a catalyst in the preparation of a polyoxypropylene sorbitol polyether. 207.3 g. of a mixture prepared by adding 6.0 g. of 50% sulfuric acid to 300.0 g. of sorbitol (containing 0.4% by weight of water) was charged to a one liter autoclave and heated to 90° C. 424 g. of propylene oxide was introduced in increments over a 2 hour period while maintaining the temperature between 90–100° C. The charge was then heated to 104–106° C. and allowed to react for an additional hour. The reaction product was purified by a cation-anion exchange method and by vacuum stripping. The resulting product had a hydroxyl number of about 668 which indicates about 5.55 propylene oxide groups per molecule.

This sulfuric acid catalyzed polyoxypropylene sorbitol polyether was evaluated for reactivity in a conventional two component urethane foam formulation similar to that used in Example IV. Only about 0.4% of tetramethylbutanediamine curing catalyst was used in the formulation. The formulation using the sulfuric acid catalyzed polyether had a cream time of about 30 seconds, whereas a comparable alkaline catalyzed polyether would have a cream time of about 2 minutes. This rapid reactivity indicates the presence of primary hydroxyl groups in the acid catalyzed polyether.

*Example VIII*

249.7 g. of a mixture prepared from 7.2 g. of a boron-trifluoride-phosphoric acid complex and 400.0 g. of sorbitol (containing 0.4% by weight of water) was reacted with 490 g. of propylene oxide at 90–100° C. for about 5.67 hours. The reaction product was purified as in Example VII and had a hydroxyl number of about 578 which indicates about 6.25 propylene oxide groups per molecule.

This acid catalyzed polyether was evaluated for reactivity in a urethane foam formulation, similar to the one used in Example VII, containing about 0.4% curing catalyst and yielded a cream time of 30 seconds. A comparable alkaline catalyzed polyether would yield a cream time of about 2 minutes.

*Example IX*

251.0 g. of sorbitol (containing 0.4% by weight of water) and 1.0 g. of zinc chloride were heated in a one liter autoclave at 110° C. 195 g. of propylene oxide was added in increments over a 5.25 hour period. The reaction proceeded slowly, and during this time, the temperatures of the reaction was increased to 160° C. The reaction mixture was allowed to cool to room temperature, an additional 10.0 g. of zinc chloride was charged to the reaction mixture, and an additional 155 g. of propylene oxide was reacted at 160° C. The reaction was continued for about 20 hours. The reaction product was purified by a cation-anion exchange resin method and also vacuum stripped. The resulting product had a hydroxyl number of about 782.

This acid catalyzed polyether was tested for reactivity in a urethane foam formulation similar to the one used in Example VII, containing about 0.4% curing catalyst. The formulation had a cream time of about 35 seconds, whereas a comparable alkaline catalyzed polyether would have a cream time of about 2 minutes.

*Example X*

400.0 g. of sorbitol (containing 0.4% by weight of water) was heated at 120° C. under vacuum for 1.5 hours, cooled to 90° C. and 10.1 g. of stannic chloride was added. 278.0 g. of this mixture was charged to a one liter autoclave and reacted with 416.0 g. of propylene oxide at 90–100° C. over a 5.5 hour period. The reaction product was purified as in Example IX. It had a hydroxyl number of about 715.

This acid catalyzed polyether was also tested for reactivity in a urethane foam formulation similar to the one used in Example VII. The formulation had a cream time of about 50 seconds.

Having completely described this invention, what is claimed is:

1. A rigid urethane foam prepared by reacting a urethane forming organic material containing free isocyanato groups, in the presence of a blowing agent with an acid catalyzed condensation product of propylene oxide and sorbitol, the propylene oxide content of said condensation product being in the proportion of from 0.5 to 3 moles of propylene oxide per mol of sorbitol hydroxyl groups.

2. A rigid foam in accordance with claim 1 in which the urethane forming organic material is a urethane prepolymer.

3. A rigid foam in accordance with claim 2 in which the prepolymer is prepared by reacting an arylene diisocyanate and an acid catalyzed condensation product of propylene oxide with sorbitol, the propylene oxide content of said condensation product being in the proportion of from 0.5 to 3 mols of propylene oxide per mol of sorbitol hydroxyl groups.

References Cited

UNITED STATES PATENTS

| | | | |
|---|---|---|---|
| 1,922,459 | 8/1933 | Schmidt et al. | 260—615 |
| 2,260,753 | 10/1941 | Marple et al. | 260—615 |
| 3,036,021 | 5/1962 | Trescher et al. | 260—2.5 |
| 3,067,148 | 12/1962 | Sandridge et al. | 260—2.5 |

FOREIGN PATENTS 733,624  7/1955  Great Britain.

OTHER REFERENCES

Gaylord: "Polyethers, Part I," (1963), pages 142 and 324.

Wilson: "Modern Plastics," pages 151 and 154, May 1959.

DONALD E. CZAJA, *Primary Examiner.*

LEON J. BERCOVITZ, *Examiner.*

G. W. RAUCHFUSS, Jr., J. KLOCKO,
*Assistant Examiners.*

UNITED STATES PATENT OFFICE

CERTIFICATE OF CORRECTION

Patent No. 3,359,217                  December 19, 1967

John D. Brandner

It is certified that error appears in the above identified patent and that said Letters Patent are hereby corrected as shown below:

Column 2, line 23, "polymers" should read -- polyethers --; between lines 39 and 40, insert -- sorbitol, mannitol, dulcitol, quercitol, inositol, lactositol --. Column 5, line 17, "gorups" should read -- groups --.

Signed and sealed this 9th day of December 1969.

(SEAL)
Attest:

Edward M. Fletcher, Jr.                    WILLIAM E. SCHUYLER, JR.
Attesting Officer                            Commissioner of Patents